(12) United States Patent
Ferrier et al.

(10) Patent No.: US 7,901,321 B2
(45) Date of Patent: Mar. 8, 2011

(54) AUTOMATIC TRANSMISSION WITH PART-THROTTLE SHIFTING

(75) Inventors: James Thomas Ferrier, Elgin, IL (US); Yun-Ren Ho, Naperville, IL (US); Michael Angel Cobo, Saint Charles, IL (US)

(73) Assignee: Caterpillar Inc., Peoria, IL (US)

( * ) Notice: Subject to any disclaimer, the term of this patent is extended or adjusted under 35 U.S.C. 154(b) by 363 days.

(21) Appl. No.: 12/230,526

(22) Filed: Aug. 29, 2008

(65) Prior Publication Data

US 2010/0056335 A1    Mar. 4, 2010

(51) Int. Cl.
*F16H 61/58* (2006.01)

(52) U.S. Cl. .......................................................... 477/64

(58) Field of Classification Search ................. 192/3.28, 192/3.29, 3.3, 3.31, 3.58, 3.61, 3.62, 3.63
See application file for complete search history.

(56) References Cited

U.S. PATENT DOCUMENTS

| 4,263,822 A | 4/1981 | Harmon |
| 4,697,474 A | 10/1987 | Sumiya et al. |
| 5,045,035 A | 9/1991 | Ganoung |
| 5,095,435 A | 3/1992 | Tokoro et al. |
| 5,115,897 A | 5/1992 | Yoshimura et al. |
| 5,319,559 A | 6/1994 | Kusaka et al. |
| 5,486,146 A | 1/1996 | Asahara et al. |
| 5,651,752 A | 7/1997 | Wakahara et al. |
| 5,683,327 A | 11/1997 | Inuzuka et al. |
| 5,738,606 A * | 4/1998 | Bellinger ....................... 477/111 |
| 5,846,161 A | 12/1998 | Hosseini et al. |
| 5,879,266 A | 3/1999 | Sawamura et al. |
| 6,019,703 A | 2/2000 | Black et al. |
| 6,449,547 B1 | 9/2002 | Kurihara |
| 6,508,739 B1 * | 1/2003 | Bellinger ......................... 477/62 |
| 6,537,178 B1 | 3/2003 | Takizawa et al. |
| 7,234,578 B2 * | 6/2007 | Tsunekawa ..................... 192/3.3 |

* cited by examiner

*Primary Examiner* — Dirk Wright
(74) *Attorney, Agent, or Firm* — Finnegan, Henderson, Farabow, Garrett & Dunner LLP

(57) ABSTRACT

A power train for a machine is provided having a power source and a transmission, which includes a plurality of gears configured to produce multiple output ratios when selectively engaged. The power train also has a torque converter operatively coupling the power source and the transmission. A lockup clutch is associated with the torque converter, and the engagement of the lockup clutch is restricted so that the lockup clutch is engaged only when permissible gear ratios are actuated. The power train further has a controller in communication with the lockup clutch, the controller being configured to selectively engage the lockup clutch in either a first or a second shift mode with the number of permissible gear ratios being greater in the first shift mode than the second shift mode.

20 Claims, 9 Drawing Sheets

AUTOMATIC TRANSMISSION WITH PART-THROTTLE SHIFTING

TECHNICAL FIELD

The present disclosure is directed to an automatic transmission and, more particularly, to an automatic transmission with part-throttle shifting.

BACKGROUND

Machines such as, for example, wheel loaders, dozers, backhoes, dump trucks, and other heavy equipment typically utilize automatic transmissions having a plurality of gears that are selectively engaged in predetermined combinations to produce desired gear output ratios. In an automatic transmission, the selective engagement of the plurality of gears is often performed according to preprogrammed shift points that are based on full-throttle engine speeds. At full-throttle engine speeds, the power output of an associated power train is maximized.

One way to improve fuel economy during full-throttle shifting is to improve the efficiency of the torque converter by utilizing a lockup clutch. A torque converter efficiency generally decreases as the converter speed approaches approximately 90 percent of the output speed of the associated engine due to the characteristics of the fluid in the torque converter. Engaging a lockup clutch directly links the pump of the torque converter to the turbine of the torque converter, thereby effectively creating a mechanical coupling and improving the efficiency of the torque converter.

Another method used to improve fuel economy is to utilize shift points based on part-throttle engine speeds when performing operations not requiring a maximum power output from the power train. Such a strategy may improve fuel economy because fuel consumption at part-throttle speeds is less than fuel consumption at full-throttle speeds. One example of a part-throttle shifting system can be found in U.S. Pat. No. 5,846,161 (the '161 patent) issued to Hosseini et al. on Dec. 8, 1998. The '161 patent discloses a control system that regulates shifting events based on signals indicative of an engine speed, a torque converter output speed, and a currently active gear ratio. The shift points at which shifting events occur are preprogrammed full-throttle shift points. However, an operator can adjust a minimum speed setting to use part-throttle shift points. The minimum speed setting is the lowest engine speed at which a particular shift event is permitted to occur.

Although the shifting strategy disclosed in the '161 patent may utilize part-throttle shifting, any improvement to fuel economy may be limited. In particular, the shifting strategy employed by the '161 patent does not utilize a lockup clutch in conjunction with either part-throttle or full-throttle shift strategy. Without the utilization of the lockup clutch, any improvement to the efficiency of the torque converter and the fuel economy of the power train may be limited.

The disclosed system is directed to overcoming one or more of the problems set forth above.

SUMMARY

In one aspect, the present disclosure is directed toward a power train for a machine including a power source and a transmission, which includes a plurality of gears configured to produce multiple output ratios when selectively engaged. The power train also includes a torque converter operatively coupling the power source and the transmission. A lockup clutch is associated with the torque converter, and the engagement of the lockup clutch is restricted so that the lockup clutch is engaged only when permissible gear ratios are actuated. The power train further includes a controller in communication with the lockup clutch, the controller being configured to selectively engage the lockup clutch in either a first or a second shift mode with the number of permissible gear ratios being greater in the first shift mode than the second shift mode.

Consistent with another aspect of the disclosure, a method is provided for operating a power train of a machine. The method includes selectively engaging a plurality of gear ratios according to a first set of shift points while operating in a first shift mode and selectively engaging the plurality of gear ratios according to a second set of shift points while operating in a second shift mode. The method further includes selectively engaging a torque converter lockup clutch in either the first or second shift mode when a gear ratio permissible for lockup clutch engagement is actuated, the number of permissible gear ratios in the first shift mode being greater than the number of permissible gear ratios in the second shift mode.

DETAILED DESCRIPTION

Figure 1:
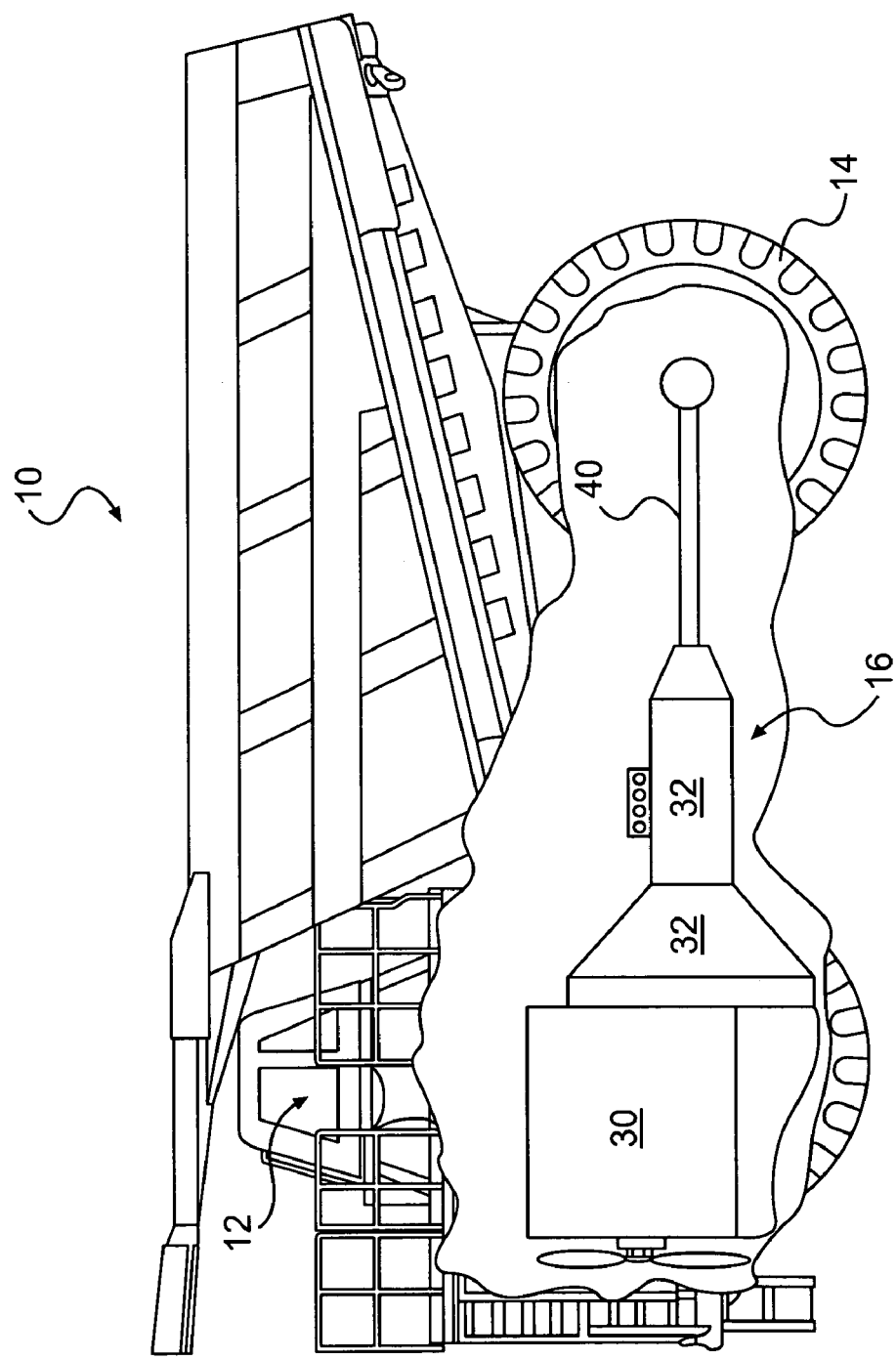
FIG. 1 is a diagrammatic illustration of an exemplary disclosed machine.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may be an earth moving machine such as an off-highway haul truck, a wheel loader, a motor grader, or any other suitable earth moving machine. Machine 10 may alternatively embody an on-highway vocational truck, a passenger vehicle, or any other operation-performing machine. Machine 10 may include an operator station 12, one or more traction devices 14, and a power train 16 for driving at least one of traction devices 14.

Traction devices 14 may embody wheels located on each side of machine 10 (only one side shown). Alternatively, traction devices 14 may include tracks, belts or other known traction devices. It is contemplated that any combination of the wheels on machine 10 may be driven and/or steered.

Figure 2:
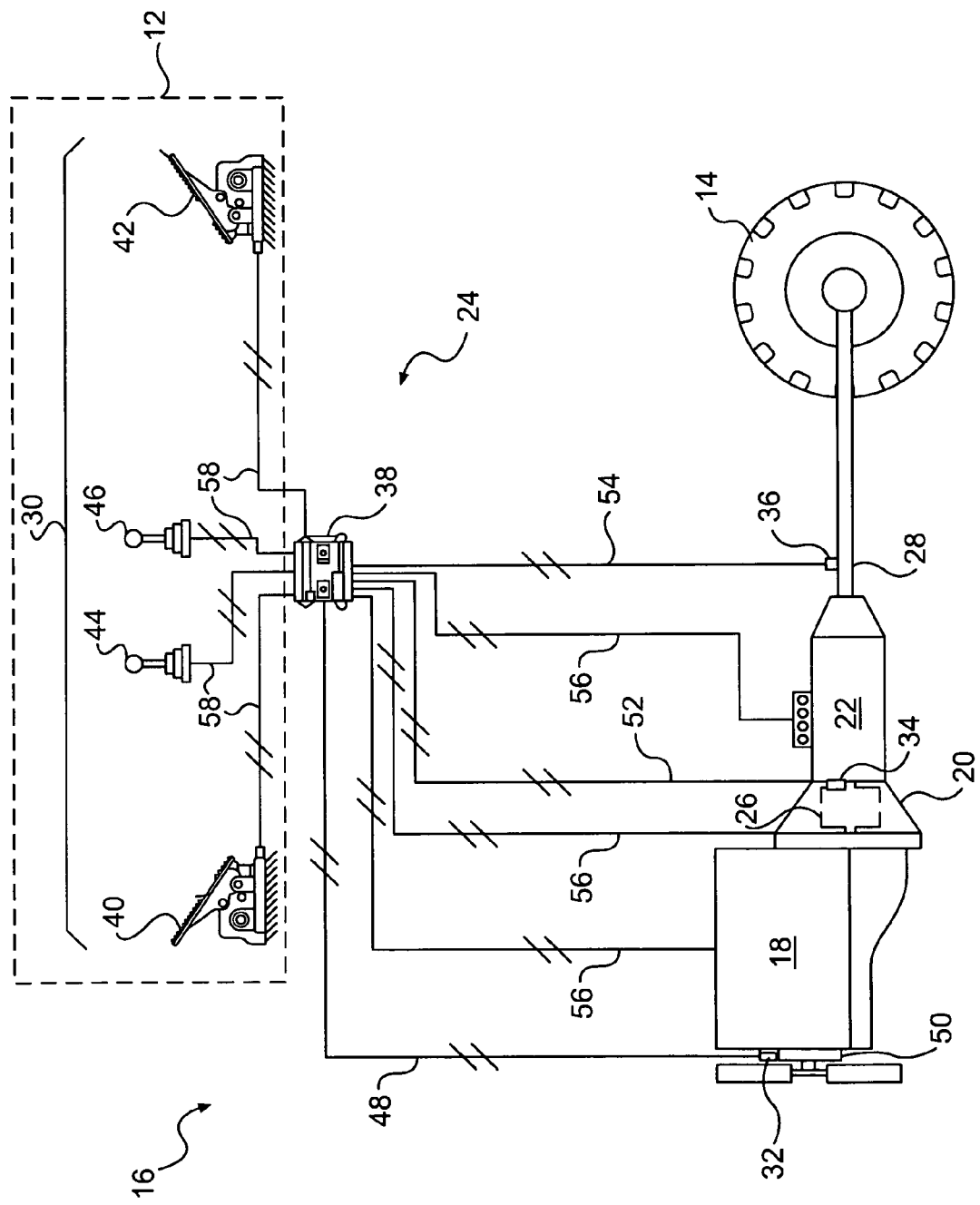
FIG. 2 is a diagrammatic illustration of an exemplary disclosed power train of the machine of FIG. 1.

As illustrated in FIG. 2, power train 16 may drive traction devices 14 in response to various operator and environmental inputs as well as a current status of various components of machine 10. Power train 16 may include a power source 18, a torque converter 20, a transmission 22 operably connected to traction devices 14, and a control system 24 for regulating the operation of power train 16 in response to one or more inputs.

Power source 18 may include an internal combustion engine having multiple subsystems that cooperate to produce mechanical or electrical power output. For the purposes of this disclosure, power source 18 is depicted and described as a four-stroke diesel engine. One skilled in the art will recognize, however, that power source 18 may be any other type of internal combustion engine such as, for example, a gasoline or a gaseous fuel-powered engine. Power source 18 may alternatively embody a non-combustion source of power such as a fuel cell, a power storage device, or any other suitable source of power.

Torque converter 20 may be a hydro-mechanical device configured to couple power source 18 to transmission 22. In particular, torque converter 20 may conduct pressurized fluid between the output of power source 18 and the input of transmission 22 to thereby drive transmission 22, while still allowing power source 18 to rotate somewhat independently of transmission 22. In addition, torque converter 20 may include a lockup clutch 26 for directly mechanically coupling the output of power source 18 to the input of transmission 22. Lockup clutch 26 may engage and disengage in response to one or more inputs, as will be described in more detail below. In this arrangement, torque converter 20 may selectively absorb and multiply the torque transferred between power source 18 and transmission 22 by either allowing or preventing slippage between the output rotation of power source 18 and input rotation of transmission 22.

Transmission 22 may be an automatic-type transmission and may include numerous components that interact to transmit power from power source 18 to traction device 14. In particular, transmission 22 may embody a multi-speed, bidirectional, mechanical transmission having a neutral gear ratio, a plurality of forward gear ratios, a plurality of reverse gear ratio, and one or more clutches (not shown). The clutches may be selectively actuated to engage predetermined combinations of gears (not shown) that produce a desired output gear ratio. The output of transmission 22 may be connected to rotatably drive traction devices 14 via a shaft 28, thereby propelling machine 10.

Control system 24 may regulate the operation of power train 16 and may include operator interface devices 30 located in operator station 12. Control system 24 may also include sensors 32, 34, and 36 for sensing various parameters indicative of power source speed, torque converter output, and transmission output. Control system 24 may further include a controller 38 for regulating the operation of power train 16 in response to signals received from operator interface devices 30 and sensors 32, 34, and 36. In an alternate embodiment, power source speed, torque converter output, and/or transmission output may be indirectly sensed based on various parameters of machine 10. Such parameters may be compared to various charts, graphs, etc. that may be stored within a memory of controller 38, and power source speeds and/or transmission output may be calculated. It is contemplated that control system 24 may include additional sensors for sensing other parameters that may be useful for operation of power train 16.

Operator interface devices 30 may receive input from a machine operator indicative of a desired machine travel maneuver and may initiate movement of machine 10 by producing displacement signals reflecting the operator input. In one embodiment, operator interface devices 30 may include a left foot pedal 40, a right foot pedal 42, a shift mode selector 44, and a maximum gear selector 46. As an operator manipulates left foot pedal 40 and/or right foot pedal 42 (i.e., displaces left and/or right foot pedals 40 and 42 away from a neutral position), the operator may expect and affect a corresponding machine travel movement. In addition, as the operator moves shift mode selector 44 to a first or second position, the operator may affect a corresponding transmission shift mode such as, for example, full-throttle or part-throttle. Maximum gear selector 46 may permit the operator to select a maximum gear ratio at which machine 10 may operate. It is contemplated that shift mode selector 44 and maximum gear selector 46 may be combined into a single operator interface device 30, if desired.

Sensor 32 may be associated with power source 18 to sense an output speed thereof and may be in communication with controller 38 via a communication line 48 (or wirelessly). In one example, sensor 32 may embody a magnetic pickup type of sensor associated with a magnet embedded within a rotational component of power source 18, such as a flywheel 50 or a crankshaft (not shown). During operation of power source 18, sensor 32 may sense the rotating magnetic field produced by the magnet and generate a signal corresponding to the rotational speed of power source 18.

Sensor 34 may be associated with torque converter 20 to sense an output speed thereof and may be in communication with controller 38 via a communication line 52 (or wirelessly). In one example, sensor 34 may embody a magnetic pickup type of sensor associated with a magnet embedded within a rotational component of torque converter 20 such as an input shaft of transmission 22 (not shown). During operation of torque converter 20, sensor 34 may sense the rotating magnetic field produced by the magnet and generate a signal corresponding to the rotational output speed of torque converter 20.

Sensor 36 may be associated with transmission 22 and/or traction device 14 to sense an output of transmission 22 and/or a travel speed of machine 10. Additionally, sensor 36 may be in communication with controller 38 via a communication line 54 (or wirelessly). In one example, sensor 36 may embody a magnetic pickup type of sensor associated with a magnet embedded within a rotational component of transmission 22 such as shaft 28. During operation of machine 10, sensor 36 may sense the rotating magnetic field produced by the magnet and generate a signal corresponding to the rotational speed of transmission 22 and/or the corresponding travel speed of machine 10.

Controller 38 may regulate the operation of power train 16 in response to operator requests, environmental inputs, and/or signals received from sensors 32, 34, and 36. In addition, controller 38 may communicate via one or more communication lines 56 (or wirelessly) with power source 18, torque converter 20, and transmission 22. Furthermore, controller 38 may communicate via communication lines 58 (or wirelessly) with operator interface devices 30. The operator requests may include magnitude of propulsion, vehicular speed, output torque, or any other request that may affect the operation of power train 16. A plurality of maps, algorithms, charts, graphs, etc. may be stored in the memory of controller 38 for interpreting various signals indicative of the operator's request. Such signals may be received from displacement sensors (not shown) associated with left and right pedals 40, 42, shift mode selector 44, maximum gear selector 46, and/or any other operator interface device 30. Upon determining the operator request, controller 38 may receive additional input from sensors 32, 34 and 36 to determine a course of action for operating power train 16.

One possible course of action may be automatically shifting from one gear ratio to another. Each automatic gear shifting event may be based on a shift mode in which power train 16 may be currently operating and a shift map stored in the memory of controller 38 that may be associated with the current shift mode. Such shift modes may include a full-throttle shift mode, in which an automatic shifting event may occur only when power source 18 is operating at full throttle speeds, and a part-throttle mode in which automatic shifting events may occur when power source 18 is operating at part-throttle speeds. Power train 16 may operate in a particular shift mode based on signals received from shift mode selector 44. For example, if the operator sets shift mode selector 44 to a full-throttle shift mode position, signals may be transmitted to controller 38 via communication lines 58 and may cause power train 16 to operate in the full-throttle shift mode. Alternatively, controller 38 may automatically switch to a particular shift mode in response to environmental data, signals received from sensors 32, 34, 36, and/or other parameters indicative of a current operating state of machine 10.

For applications utilizing a maximum power output of power train 16 and/or full use of lockup clutch 26 (i.e., designating all gear ratios except the first gear ratio as being permissible for the engagement of lockup clutch 26), power train 16 may be set to operate in the full-throttle shift mode. While operating in the full-throttle shift mode, controller 38 may regulate shifting events according to a full-throttle shift table based on a full-throttle rim power curve.

Figure 3:
FIG. 3 illustrates an exemplary full-throttle shift table, which may be utilized by a controller of the power train of FIG. 2.

FIG. 3 illustrates an exemplary full-throttle shift table 100, which may list upshift and downshift points for each gear ratio. An upshift point may be a particular power source speed at which it may be desired to upshift from an current gear ratio, and a downshift point may be a particular power source speed at which it may be desired to downshift from a current gear ratio. For example, according to full-throttle shift table 100, if the power source speed is approximately 299 RPM while the first gear ratio is engaged, it may be desired to upshift to the second gear ratio. In addition, if the power source speed is 275 RPM while the second gear ratio is engaged, it may be desired to downshift to the first gear ratio.

Figure 4:
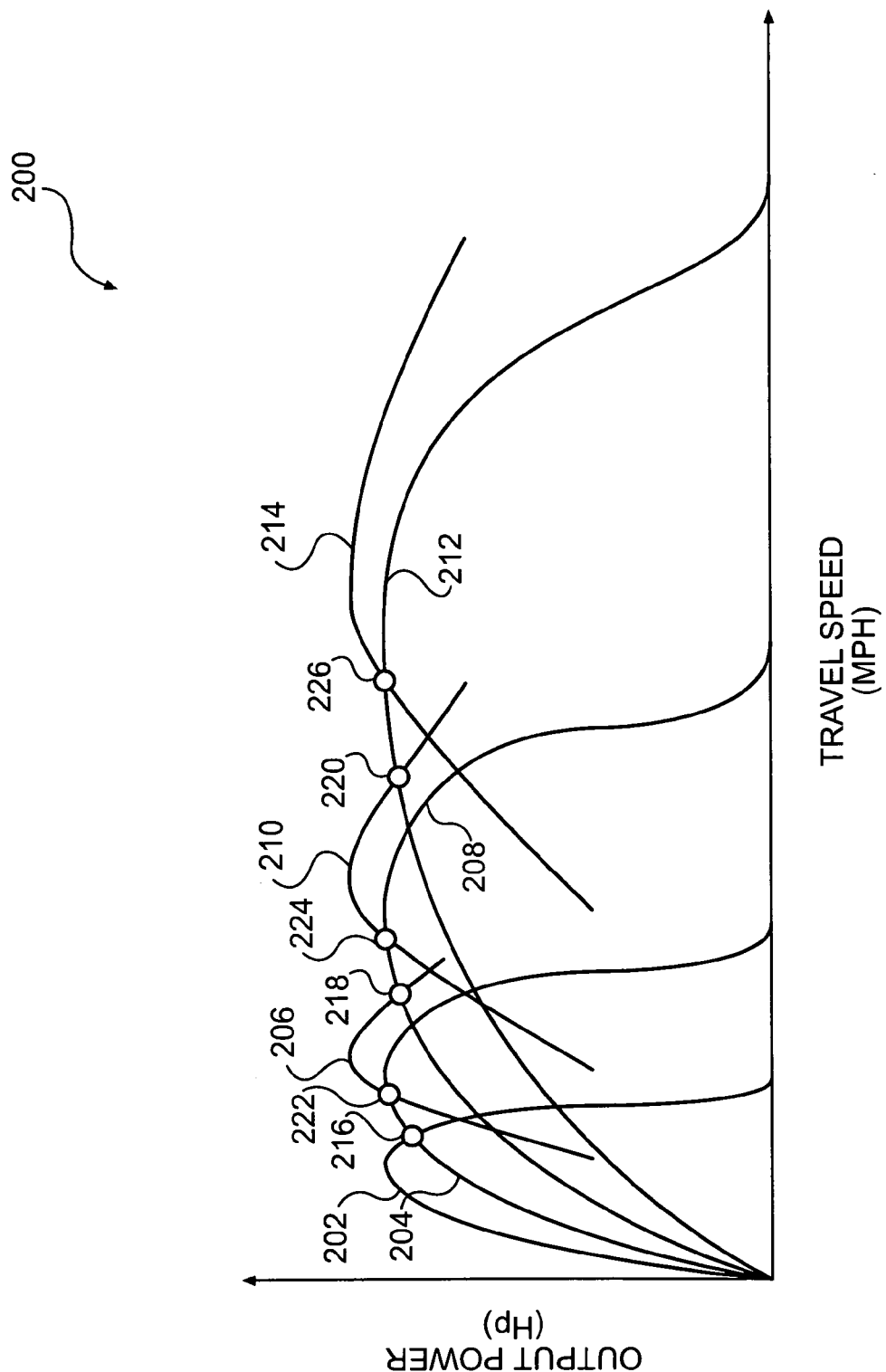
FIG. 4 illustrates a set of exemplary full-throttle power curves for a first gear ratio, a second gear ratio, a third gear ratio, and a fourth gear ratio of the power train of FIG. 2.

The upshift and downshift points listed in shift table 100 may be based on data points calculated from a full-throttle rim power curve. A full-throttle rim power curve may be based on a full-throttle engine curve associated with power source 18 and may include a plurality of power curves for various gear ratios. FIG. 4 illustrates an exemplary full-throttle rim power curve 200. Full-throttle rim power curve 200 may include an x-axis representing a machine traveling speed and a y-axis representing a power output of power train 16. Full-throttle rim power curve 200 may include a power curve 202 for a first gear ratio, a power curve 204 for a second gear ratio with lockup clutch 26 disengaged, a power curve 206 for the second gear ratio with lockup clutch 26 engaged, a power curve 208 for a third gear ratio with lockup clutch 26 disengaged, a power curve 210 for the third gear ratio with lockup clutch 26 engaged, a power curve 212 for a fourth gear ratio with lockup clutch 26 disengaged, and a power curve 214 for the fourth gear ratio with lockup clutch 26 engaged. As can be seen, each gear ratio may provide enhanced power over certain speed ranges. For example, the first gear ratio may provide enhanced power at a relatively lower range of speeds; the second and third gear ratios may provide enhanced power at a relatively intermediate range of speeds, and the fourth gear ratio may provide enhanced power at a relatively higher range of speeds. While four gear ratios are illustrated and discussed for purposes of simplifying the explanation of the present invention, it is contemplated that a lesser or greater number of gear ratios may be implemented in an embodiment of the invention.

A crossover point may be the intersection of two power curves and may represent a point at which the power and speed of the output shaft are the same in two adjacent gear ratios. For example, power curves 202 and 204 may intersect at a crossover point 216, power curves 206 and 208 may intersect at a crossover point 218, and power curves 210 and 212 may intersect at a crossover point 220. These crossover points may indicate conditions at which it may be desired to shift between gear ratios and may be used to create the shift points listed in full-throttle shift table 100. It should be understood that only crossover points at which power curves from different gear ratios intersect may indicate conditions at which it may be desired to perform a shifting event. Therefore, even though power curves 204 and 206 intersect at a crossover point 222, power curves 208 and 210 intersect at a crossover point 224, and power curves 212 and 214 intersect at a crossover point 226, such crossover points may not indicate conditions at which it may be desired to shift between gear ratios because the power curves associated with such crossover points may represent the same gear ratio. In addition, crossover points 222, 224, and 226 may not indicate conditions at which it may be desired to engage lockup clutch 26. Instead, lockup clutch 26 may be engaged according to a designated speed, power output, or other parameter that may indicate conditions favorable for engaging lockup clutch 26.

For applications utilizing less than a maximum power output of power train 16, power train 16 may be set to operate in the part-throttle shift mode. While operating in the part-throttle shift mode, a top gear ratio may be selected either manually by setting maximum gear selector 46 to a desired position or automatically based on signals received from various sensors located throughout machine 10. The top gear ratio may be the highest gear ratio at which transmission 22 may be permitted to operate. In addition, while the part-throttle shift mode is active, lockup clutch 26 may be engaged only when the top gear ratio is active. The engagement of lockup clutch 26 may be restricted because part-throttle shifting may not be possible with lockup clutch 26 set to an engaged position.

Figure 5:
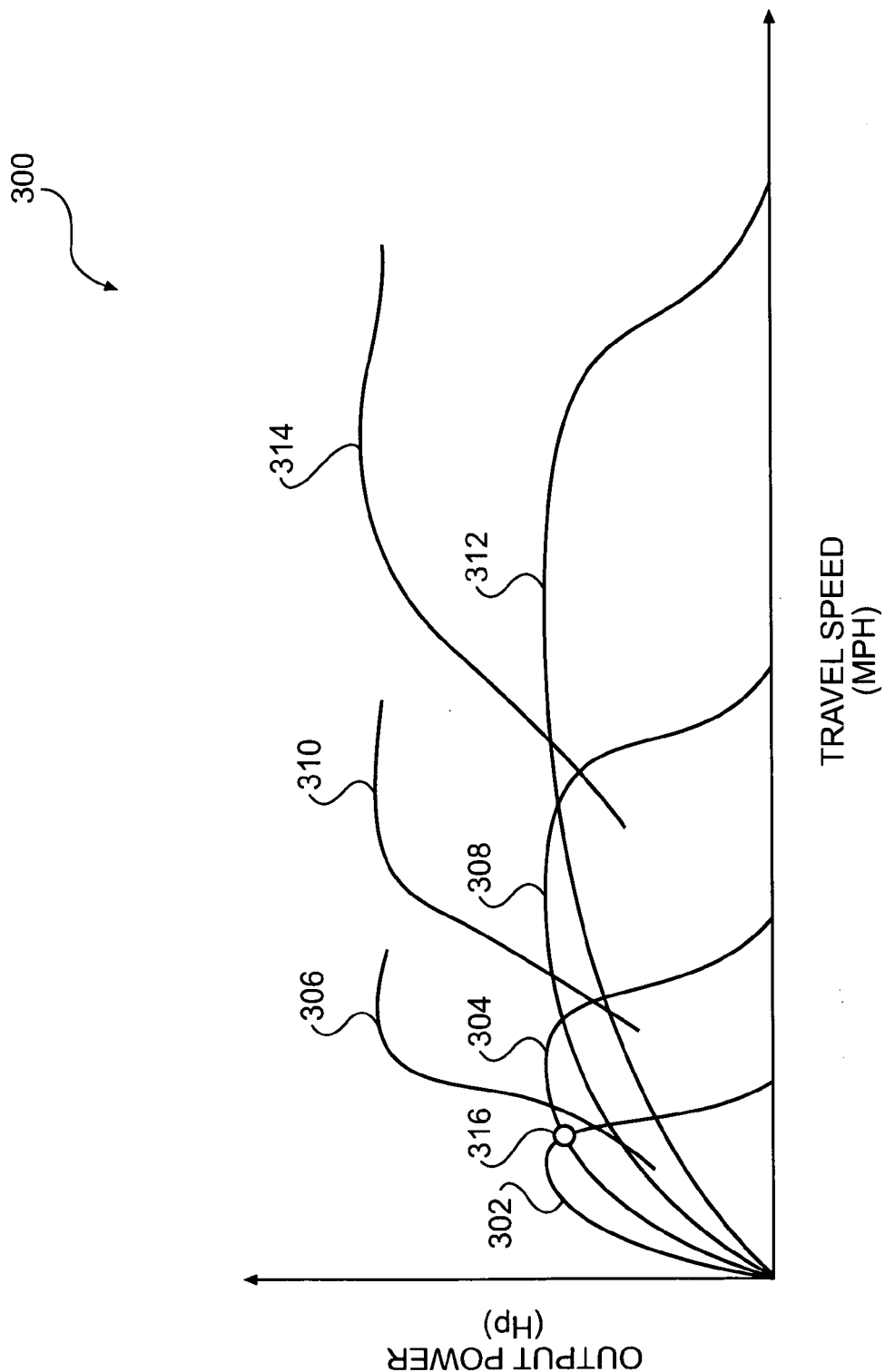
FIG. 5 illustrates a set of exemplary part-throttle power curves for a first gear ratio, a second gear ratio, a third gear ratio, and a fourth gear ratio of the power train of FIG. 2.

The reason why the engagement of lockup clutch 26 may interfere with part-throttle shifting events may be demonstrated by an exemplary part-throttle rim power curve 300 illustrated in FIG. 5. Part-throttle rim power curve 300 may represent a situation utilizing part-throttle shifting with lockup clutch 26 being permitted to engage multiple gear ratios. Similar to full-throttle rim power curve 200, part-throttle rim power curve 300 may include an x-axis representing a machine traveling speed and a y-axis representing a power output of power train 16. Part-throttle rim power curve 300 may include a power curve 302 for a first gear ratio, a power curve 304 for a second gear ratio with lockup clutch 26 disengaged, a power curve 306 for the second gear ratio with lockup clutch 26 engaged, a power curve 308 for a third gear ratio with lockup clutch 26 disengaged, a power curve 310 for the third gear ratio with lockup clutch 26 engaged, a power curve 312 for a fourth gear ratio with lockup clutch 26 disengaged, and a power curve 314 for the fourth gear ratio with lockup clutch 26 engaged.

Part-throttle rim power curve 300 may be one of a plurality of curves associated with power train 16. Each part-throttle rim power curve may indicate the power output of the transmission gear ratios for various travel speeds at a particular power source speed that is less than high-idle. For example, if power source 18 has a high-idle speed of 1900 rpm, part-throttle rim power curve 300 may indicate the power output of the transmission gear ratios for a power source speed of 1700 rpm. One difference between the power curves of part-throttle rim power curve 300 and the power curves of full-throttle rim power curve 200 is the shape of the power curves. As the speed of power source 18 decreases, the peak and width of each power curve may decrease as well. The changing shapes of the power curves may affect the number of crossover points associated with a particular rim power curve. As can be seen, if lockup clutch 26 is permitted to engage for each gear ratio, the only crossover point at which power curves from different gear ratios may intersect may be a crossover point 316 indicating an intersection of power curves 302 and 304. Therefore, if lockup clutch 26 is permitted to engage for each gear ratio while power train 16 operates in the part throttle mode, controller 38 may perform shifting events only between the first and second gear ratios.

Figure 6:
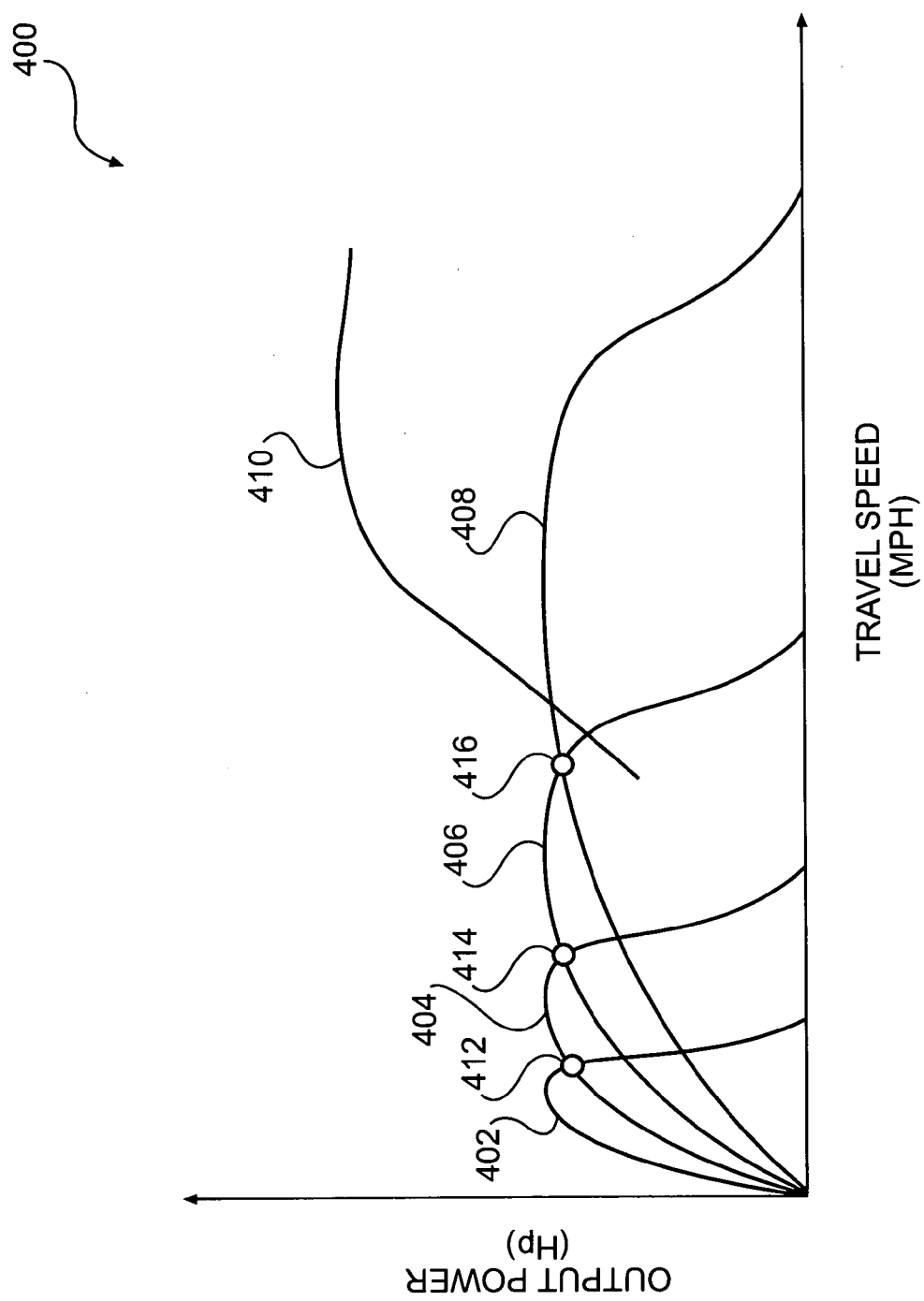
FIG. 6 illustrates another set of exemplary part-throttle power curves for a first gear ratio, a second gear ratio, a third gear ratio, and a fourth gear ratio of the power train of FIG. 2.

FIG. 6 illustrates an exemplary part-throttle rim power curve 400 that may be used when power train 16 is operating in the part-throttle mode and maximum gear selector 46 is set to the fourth gear ratio. When operating in the part-throttle shift mode, the only permissible gear ratio for which lockup clutch 26 may be engaged is the gear ratio to which maximum gear selector 46 may be set. Part-throttle rim power curve 400 may include a power curve 402 for a first gear ratio, a power curve 404 for a second gear ratio with lockup clutch 26 disengaged, a power curve 406 for a third gear ratio with lockup clutch 26 disengaged, a power curve 408 for a fourth gear ratio with lockup clutch 26 disengaged, and a power curve 410 for the fourth gear ratio with lockup clutch 26 engaged. As can be seen, power curves 402 and 404 may intersect at a crossover point 412, power curves 404 and 406 may intersect at a crossover point 414, and power curves 406 and 408 may intersect at a crossover point 416. With the engagement of lockup clutch 26 being restricted to engage only when the fourth gear ratio is actuated, crossover points may occur between the first and second gear ratios, between the second and third gear ratios, and between the third and fourth gear ratios, thereby permitting shifting events for all of the gear ratios.

Figure 7:
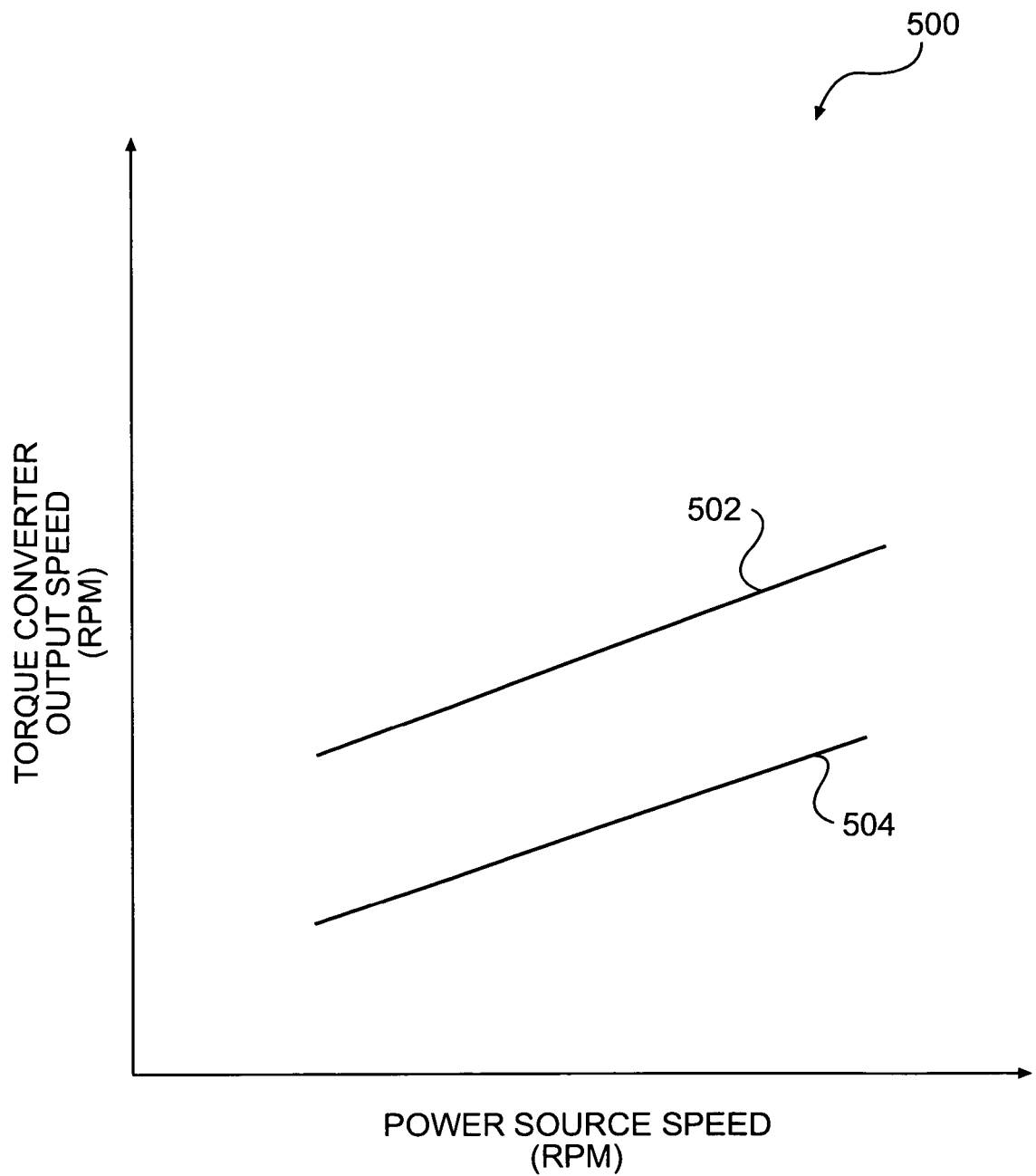
FIG. 7 illustrates an exemplary part-throttle shift map, which may be utilized by a controller of the power train of FIG. 2.

While operating in the part-throttle shift mode, controller 38 may regulate shifting events according to a part-throttle shift map based on the crossover points of one or more part-throttle rim power curves. FIG. 7 illustrates an exemplary part-throttle shift map 500, which may include an x-axis representing a power source speed sensed by sensor 32 and a y-axis representing a torque converter output speed sensed by sensor 34. Unlike shift table 100, which may list individual upshift and downshift points for each gear ratio, part-throttle shift map 500 may include an upshift line 502 and a downshift line 504. Each of upshift line 502 and downshift line 504 may be comprised of multiple upshift and downshift points corresponding to different throttle settings (e.g., 50% throttle, 75% throttle, and 85% throttle). For torque converter output speeds below upshift line 502, transmission 22 may continue operating in the current gear ratio. However, as the converter output speed catches up to the power source speed and moves above upshift line 502, controller 38 may cause transmission 22 to shift to the next higher gear ratio. After the upshift event, the power source speed may immediately drop to a base line speed and then increase at the previous rate. The torque converter output may do the same, and the process may be repeated until the highest gear ratio is actuated or the acceleration event is completed. Downshift events may occur in a similar manner as upshift events, with downshifts occurring when the torque converter output speed falls below downshift line 504.

Figure 8:
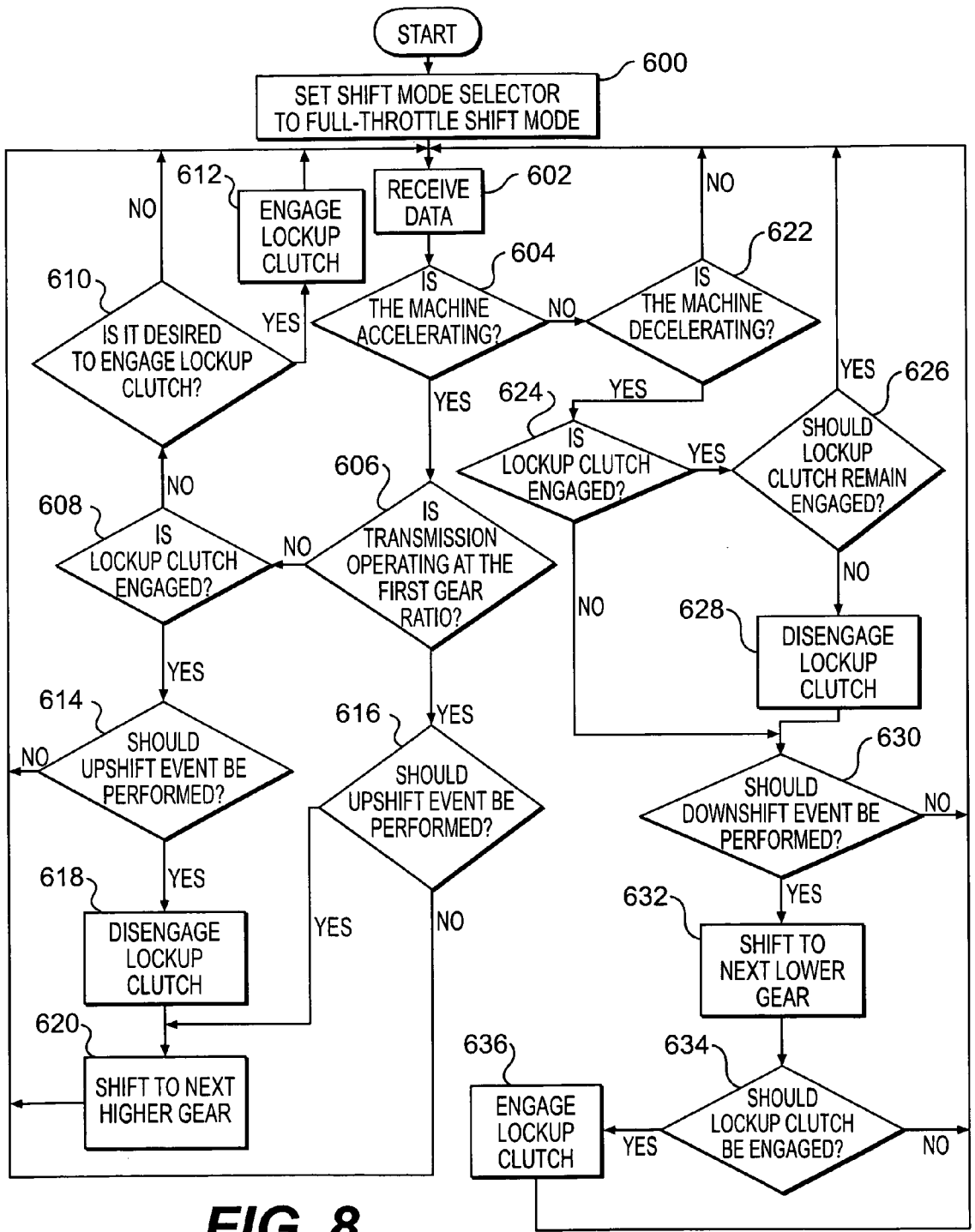
FIG. 8 is a flow chart illustrating an exemplary method for performing shift events while operating the power train of FIG. 2 in a full-throttle shift mode.
Figure 9:
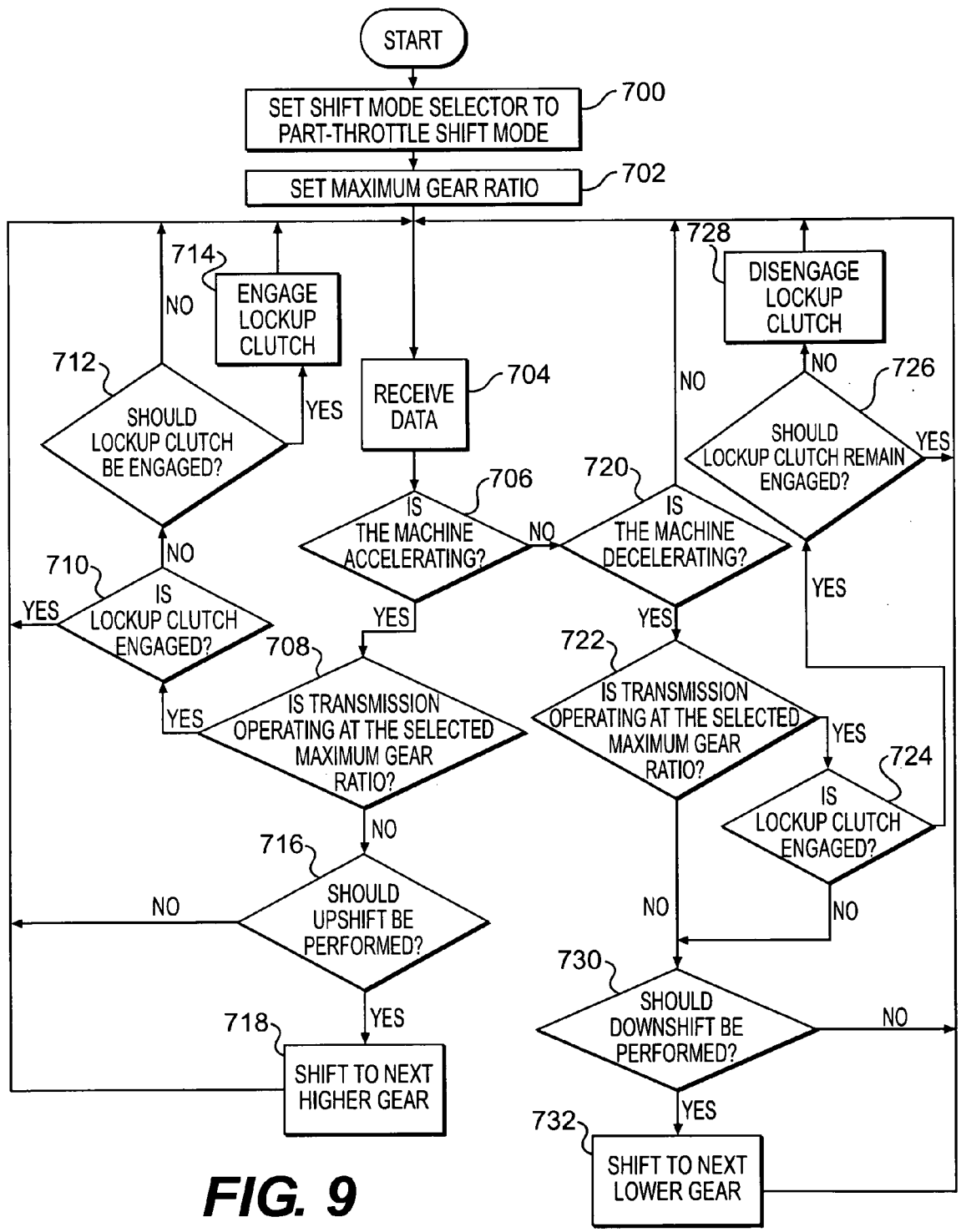
FIG. 9 is a flow chart illustrating an exemplary method for performing shift events while operating the power train of FIG. 2 in a part-throttle shift mode.

FIGS. 8 and 9, which are discussed in the following section, illustrate the operation of power train 16. In particular, FIG. 8 illustrates an exemplary method for performing shifting events while in the full-throttle shift mode. In addition, FIG. 9 illustrates an exemplary method for performing shifting events while in the part-throttle shift mode.

INDUSTRIAL APPLICABILITY

The disclosed system may improve the efficiency of a power train of a machine. In particular, the power train may engage a torque converter lockup clutch in both a full-throttle shift mode and a part-throttle shift mode. Such a configuration may permit increased efficiency for a wider range of machine applications such as, for example, applications requiring a maximum power output and applications requiring less than a maximum power output. The operation of the power train will now be explained.

FIG. 8 illustrates a flow diagram depicting an exemplary method for operating power train 16 in the full-throttle shift mode. The method may begin when the operator sets shift mode selector 44 to a full-throttle position (step 600). After power train 16 is set to the full-throttle shift mode, controller 38 may receive signals from sensors 32, 34, and 36 indicative of a current state of power source 18, torque converter 20, and transmission 22 (step 602). Controller 38 may analyze the received signals to determine whether machine 10 is accelerating (step 604).

If controller 38 determines that machine 10 is accelerating (step 604: Yes), controller 38 may determine whether transmission 22 is operating in the first gear ratio (step 606). Such a determination may be made because shifting events involving the first gear ratio may be different from shifting events involving other gear ratios. Unlike other gear ratios, engaging the lockup clutch in first gear for some machines may not be desired. Therefore, in some machines, lockup clutch 26 may not be engaged when the first gear ratio is actuated.

If controller 38 determines that transmission 22 is not operating in the first gear ratio (step 606: No), controller 38 may determine whether lockup clutch 26 is engaged (step 608). If lockup clutch 26 is not engaged (step 608: No), controller 38 may determine whether it may be desired to engage lockup clutch 26 (step 610). Lockup clutch 26 may be engaged for any number of reasons such as, for example, higher efficiency, greater power, or any other reason known in the art. Parameters that may be used to determine whether to engage lock-up clutch 26 may include a traveling speed of machine 10, a speed differential between power source 18 and torque converter 20, and/or any other parameter that may affect the power transferring efficiency of torque converter 20. If it is desired to engage lockup clutch 26 (step 610: Yes), lockup clutch 26 may be engaged (step 612). After lockup clutch 26 has been engaged or if it is not desired to engage lockup clutch 26 (step 610: No), step 602 may be repeated (i.e., controller 38 may receive signals from sensors 32, 34, and 36 indicative of a current state of power source 18, torque converter 20, and transmission 22).

Referring back to steps 606 and 608, if controller 38 determines that lockup clutch 26 is engaged (step 608: Yes) or if transmission 22 is currently operating in the first gear ratio (step 606: Yes), controller 38 may reference a full-throttle shift table to determine whether an upshift event should be performed (steps 614 and 616, respectively). An upshift event should be performed if the power source speed is substantially the same as the power source speed of an upshift point corresponding to the currently engaged gear ratio. If controller 38 determines that an upshift event should not be performed (steps 614 and 616: No), step 602 may be repeated (i.e., controller 38 may receive signals from sensors 32, 34, and 36 indicative of a current state of power source 18, torque converter 20, and transmission 22). However, if lockup clutch 26 is engaged and controller 38 determines that an upshift event should be performed (step 614: Yes), controller 38 may disengage lockup clutch 26 (step 618). After lockup clutch 26 has been disengaged or if transmission 22 is operating in the first gear ratio and controller 38 determines that an upshift event should be performed (step 616: Yes), controller 38 may perform an upshift event (step 620). Once the upshift event is performed step 602 may be repeated (i.e., controller 38 may receive signals from sensors 32, 34, and 36 indicative of a current state of power source 18, torque converter 20, and transmission 22).

Referring back to step 604, if controller 38 determines that machine 10 is not accelerating (step 604: No), controller 38 may determine whether machine 10 is decelerating (step 622). If machine 10 is not decelerating (step 622: No), step 602 may be repeated (i.e., controller 38 may receive signals from sensors 32, 34, and 36 indicative of a current state of power source 18, torque converter 20, and transmission 22). However, if machine 10 is decelerating (step 622: Yes), controller 38 may determine whether lockup clutch 26 is engaged (step 624).

If lockup clutch 26 is engaged (step 624: Yes), controller 38 may determine whether lockup clutch 26 should remain engaged (step 626). Such a determination may be performed in a manner similar to the one disclosed above for step 610. If controller 38 determines that lockup clutch 26 should remain engaged (step 626: Yes), step 602 may be repeated (i.e., controller 38 may receive signals from sensors 32, 34, and 36 indicative of a current state of power source 18, torque converter 20, and transmission 22). However, if controller 38 determines that lockup clutch 26 should be disengaged (step 626: No), controller 38 may disengage lockup clutch 26 (step 628).

After lockup clutch 26 is disengaged or if controller 38 determines that lockup clutch is not engaged (step 624: No), controller 38 may reference a full-throttle shift table to determine whether a downshift event should be performed (step 630). A downshift event should be performed if the power source speed is substantially the same as the power source speed of a downshift point corresponding to the currently engaged gear ratio. If controller 38 determines that a downshift event should not be performed (step 630: No), step 602 may be repeated (i.e., controller 38 may receive signals from sensors 32, 34, and 36 indicative of a current state of power source 18, torque converter 20, and transmission 22). However, if controller 38 determines that a downshift event should be performed (step 630: Yes), controller 38 may perform a downshift event (step 632).

After performing the downshift event, controller 38 may determine whether lockup clutch 26 should be engaged (step 634). Such a determination may be performed in a manner similar to the one disclosed above for step 610. If controller 38 determines that lockup clutch 26 should not be engaged (step 634: No), step 602 may be repeated (i.e., controller 38 may receive signals from sensors 32, 34, and 36 indicative of a current state of power source 18, torque converter 20, and transmission 22). If controller 38 determines that lockup clutch 26 should be engaged (step 634: Yes), lockup clutch 26 may be engaged (step 636). After lockup clutch 26 is engaged, step 602 may be repeated (i.e., controller 38 may receive signals from sensors 32, 34, and 36 indicative of a current state of power source 18, torque converter 20, and transmission 22).

FIG. 9 illustrates a flow diagram depicting an exemplary method for operating power train 16 in the part-throttle shift mode. The method may begin when the operator sets shift mode selector 44 to a part-throttle position (step 700). After power train 16 has been set to the part-throttle operating mode, maximum gear selector 46 may be set to a desired maximum gear ratio in which transmission 22 may be permitted to operate (step 702). Alternatively, the maximum gear ratio may be selected automatically by controller 38 in response to various machine parameters. While operating in the part-throttle mode, the engagement of lockup clutch 26 may be limited so that lockup clutch 26 may engage only when the selected maximum gear ratio is actuated.

After the maximum gear ratio has been selected, controller 38 may receive signals from sensors 32, 34, and 36 indicative of a current state of power source 18, torque converter 20, and transmission 22 (step 704). Controller 38 may analyze the received signals to determine whether machine 10 is accelerating (step 706). If controller 38 determines that machine 10 is accelerating (step 706: Yes), controller 38 may determine whether transmission 22 is operating at the selected maximum gear ratio (step 708). Such a determination may be made because, as was disclosed above, lockup clutch 26 may be engaged only while the selected maximum gear is actuated.

If controller 38 determines that transmission 22 is operating in the selected maximum gear ratio (step 708: Yes), controller 38 may determine whether lockup clutch 26 is engaged (step 710). If lockup clutch 26 is engaged (step 710: Yes), step 704 may be repeated (i.e., controller 38 may receive signals from sensors 32, 34, and 36 indicative of a current state of power source 18, torque converter 20, and transmission 22). However, if lockup clutch is not engaged (step 710: No), controller 38 may determine whether lockup clutch 26 should be engaged (step 712). Such a determination may be performed in a manner similar to the one disclosed above for step 610 of FIG. 8. If lockup clutch 26 should be engaged (step 712: Yes), lockup clutch 26 may be engaged (step 714). After lockup clutch 26 has been engaged or if is determined that lockup clutch 26 should not be engaged (step 712: No), step 704 maybe repeated (i.e., controller 38 may receive signals from sensors 32, 34, and 36 indicative of a current state of power source 18, torque converter 20, and transmission 22).

Referring back to step 708, if controller 38 determines that transmission 22 is not currently operating at the selected maximum gear ratio (step 708: No), controller 38 may reference a part-throttle shift map to determine whether an upshift event should be performed (step 716). An upshift event should be performed if the current torque converter speed is above an upshift line of the part-throttle shift map. If controller 38 determines that an upshift event should not be performed (step 716: No), step 704 may be repeated (i.e., controller 38 may receive signals from sensors 32, 34, and 36 indicative of a current state of power source 18, torque converter 20, and transmission 22). However, if controller 38 determines that an upshift event should be performed (step 716: Yes), controller 38 may perform an upshift event (step 718). Once the upshift event is performed step 704 may be repeated (i.e., controller 38 may receive signals from sensors 32, 34, and 36 indicative of a current state of power source 18, torque converter 20, and transmission 22).

Referring back to step 706, if controller 38 determines that machine 10 is not accelerating (step 706: No), controller 38 may determine whether machine 10 is decelerating (step 720). If machine 10 is not decelerating (step 720: No), step 704 may be repeated (i.e., controller 38 may receive signals from sensors 32, 34, and 36 indicative of a current state of power source 18, torque converter 20, and transmission 22). However, if machine 10 is decelerating (step 720: Yes), controller 38 may determine whether transmission 22 is operating at the selected maximum gear ratio (step 722).

If controller 38 determines that transmission 22 is operating at the selected maximum gear ratio (step 722: Yes), controller 38 may determine whether lockup clutch 26 is engaged (step 724). If lockup clutch 26 is engaged (step 724: Yes), controller 38 may determine whether lockup clutch 26 should remain engaged (step 726). Such a determination may be made in a manner similar to that disclosed above for step 610 of FIG. 8. If lockup clutch 26 should not remain engaged (step 726: No), lockup clutch 26 may be disengaged (step 728). After lockup clutch 26 has been disengaged or if it is determined that lockup clutch 26 should remain engaged (step 726: Yes), step 704 may be repeated (i.e., controller 38 may receive signals from sensors 32, 34, and 36 indicative of a current state of power source 18, torque converter 20, and transmission 22).

If controller 38 determines lockup clutch 26 is disengaged (step 724: No) or if transmission 22 is not currently operating at the selected maximum gear ratio (step 722: No), controller 38 may reference a part-throttle shift map to determine whether a downshift event should be performed (step 730). A downshift event should be performed if the current torque converter speed is below a downshift line of the part-throttle shift map. If the controller 38 determines that a downshift event should not be performed (step 730: No), step 704 may be repeated (i.e., controller 38 may receive signals from sensors 32, 34, and 36 indicative of a current state of power source 18, torque converter 20, and transmission 22). However, if controller 38 determines that a downshift event should be performed (step 730: Yes), controller 38 may perform a downshift event (step 732). Once the downshift event is performed step 704 may be repeated (i.e., controller 38 may receive signals from sensors 32, 34, and 36 indicative of a current state of power source 18, torque converter 20, and transmission 22).

Engaging a lockup clutch in a full-throttle and part-throttle mode may improve the flexibility and efficiency of a power train by permitting the power train to efficiently perform operations that require either maximum power output or less than maximum power output. In particular, by employing a lockup clutch in both full-throttle and part-throttle modes, the power train may be able to benefit from the combined increased efficiency provided by the engagement of a lockup clutch and the utilization of part-throttle shifting.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A power train, comprising:
    a power source;
    a transmission including a plurality of gears configured to produce multiple output ratios when selectively engaged;
    a torque converter operatively coupling the power source and the transmission;
    a lockup clutch associated with the torque converter, the engagement of the lockup clutch being restricted so that the lockup clutch is engaged only when permissible gear ratios are actuated; and
    a controller in communication with the lockup clutch, the controller being configured to selectively engage the lockup clutch in either a first or a second shift mode with the number of permissible gear ratios being greater in the first shift mode than the second shift mode.

2. The power train of claim 1, wherein the controller is further configured to selectively engage the plurality of gear ratios according to a first set of shift points while operating in the first shift mode.

3. The power train of claim 1, wherein the first set of shift points are based on a power output of the plurality of gear ratios occurring at a full-throttle engine speed.

4. The power train of claim 3, wherein the controller is further configured to selectively engage the plurality of gear ratios according to a second set of shift points while operating in the second shift mode.

5. The power train of claim 4, wherein the second set of shift points are based on a power output of the plurality of gear ratios occurring at part-throttle engine speeds.

6. The power train of claim 1, further including a maximum gear selector for selecting a maximum gear ratio in which the transmission can operate in the second shift mode.

7. The power train of claim 6, wherein the only permissible gear ratio for which the lockup clutch can be engaged when operating in the second shift mode is the selected maximum gear ratio.

8. A method for controlling a power train of a machine, comprising:
    selectively engaging a plurality of gear ratios according to a first set of shift points while operating in a first shift mode;
    selectively engaging the plurality of gear ratios according to a second set of shift points while operating in a second shift mode; and
    selectively engaging a torque converter lockup clutch in either the first or second shift mode when a gear ratio permissible for lockup clutch engagement is actuated, the number of permissible gear ratios in the first shift mode being greater than the number of permissible gear ratios in the second shift mode.

9. The method of claim 8, further including selecting a maximum gear ratio in which a transmission of the power train can operate when the power train is operating in the second shift mode.

10. The method of claim 9, wherein the only permissible gear ratio for which the torque converter lockup clutch can be engaged when the power train is operating in the second shift mode is the selected maximum gear ratio.

11. The method of claim 8, wherein the first set of shift points are based on a power output of the plurality of gear ratios occurring at a full-throttle engine speed.

12. The method of claim 11, wherein the second set of shift points are based on a power output of the plurality of gear ratios occurring at part-throttle engine speeds.

13. The method of claim 8, further including operating the power train in the first shift mode when the machine operation utilizes a maximum power output of the drive train.

14. The method of claim 8, further including operating the power train the second shift mode when the machine operation utilizes less than a maximum power output of the drive train.

15. A machine, comprising:
    one or more traction devices;

a power source;

a transmission for transmitting power from the power source to the one or more traction devices, the transmission including a plurality of gears configured to produce multiple output ratios when selectively engaged;

a torque converter operatively coupling the power source;

a lockup clutch associated with the torque converter; and a controller configured to selectively engage the plurality of gears according to a first set of shift points when operating the transmission in a first shift mode, selectively engage the plurality of gears according to a second set of shift points when operating the transmission in a second shift mode, and selectively engage the lockup clutch when the transmission is operating in either the first or second shift modes, the number of gear ratios for which the lockup clutch is permitted to engage being greater in the first shift mode than the second shift mode.

16. The machine of claim 15, further including a maximum gear selector for selecting a maximum gear ratio in which the transmission can operate in the second shift mode.

17. The machine of claim 16, wherein the only permissible gear ratio for which the lockup clutch can be engaged when operating in the second shift mode is the selected maximum gear ratio.

18. The machine of claim 15, wherein the first set of shift points are based on a power output of the plurality of gear ratios occurring at a full-throttle engine speed and the second set of shift points are based on a power output of the plurality of gear ratios occurring at part-throttle engine speeds.

19. The machine of claim 15, wherein the controller is further configured to operate the power source, transmission, torque converter, and lockup clutch in the first shift mode when the machine is performing an operation that utilizes a maximum power output of the power source and the transmission.

20. The machine of claim 15, wherein the controller is further configured to operate the power source, transmission, torque converter, and lockup clutch in the second shift mode when the machine is performing an operation that utilizes less than a maximum power output of the power source and the transmission.

* * * * *